United States Patent
Boscolo et al.

(10) Patent No.: US 6,208,160 B1
(45) Date of Patent: Mar. 27, 2001

(54) DETECTION OF A PERTURBATION IN THE SYNCHRONIZATION OF THE DRIVING IN A TRIPOLAR MODE OF A BRUSHLESS, SENSORLESS DC MOTOR FOR MINIMIZING TORQUE RIPPLE

(75) Inventors: Michele Boscolo, Sottomarina; Marco Viti, Sesto S. Giovanni, both of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/134,398

(22) Filed: Aug. 14, 1998

(30) Foreign Application Priority Data

Aug. 26, 1997 (IT) .............................................. VA97A0028

(51) Int. Cl.[7] ..................................................... H02P 6/02
(52) U.S. Cl. ................................................................ 324/772
(58) Field of Search ................................. 324/772, 545; 318/138, 254, 330, 778, 811

(56) References Cited

U.S. PATENT DOCUMENTS

| 3,931,556 | * | 1/1976 | Ban et al. ............................ | 318/330 |
| 5,172,036 | * | 12/1992 | Cameron .............................. | 318/138 |
| 5,231,338 | * | 7/1993 | Bulgarelli et al. .................... | 318/138 |
| 5,731,670 | * | 3/1998 | Galbiati et al. ...................... | 318/254 |
| 5,767,654 | * | 6/1998 | Menegolli et al. ................... | 318/811 |
| 5,808,440 | * | 9/1998 | Bennett et al. ...................... | 318/778 |
| 5,969,491 | * | 11/1999 | Vitti et al. ............................ | 318/254 |

* cited by examiner

Primary Examiner—Safet Metjahic
Assistant Examiner—T. R. Sundaram
(74) Attorney, Agent, or Firm—Theodore E. Galanthay; Allen, Dyer, Doppelt, Milbrath & Gilchrist, P.A.

(57) ABSTRACT

A method of detecting the relative position of the rotor of a sensorless DC brushless motor driven in a tripolar mode includes the step of monitoring the voltage difference between the drive voltage that is applied to at least one winding of the motor and the voltage drop on a resistive portion of the drive current path through the same winding. The voltage drop may be detected between the two current terminals of an MOS power device of the driving bridge of the winding. The monitoring of the voltage difference is used to signal a perturbation from a pre-existing condition of correct synchronization of the phase switchings during a driving phase in a tripolar mode of the motor. Such information may be used by the driving system to switch to one of a bipolar mode, a unipolar mode or a tripolar mode with momentary drive interruptions, until restoring a correct synchronization condition and/or attain a correct rotating speed.

21 Claims, 8 Drawing Sheets

DETECTION OF A PERTURBATION IN THE SYNCHRONIZATION OF THE DRIVING IN A TRIPOLAR MODE OF A BRUSHLESS, SENSORLESS DC MOTOR FOR MINIMIZING TORQUE RIPPLE

FIELD OF THE INVENTION

The present invention relates to motor control, and, more particularly, to a method for detecting the instantaneous rotor position of a DC brushless motor, a necessary requirement for its efficient driving.

BACKGROUND OF THE INVENTION

The brushless motor typically includes a permanent magnet rotor and a stator made up of a number of windings that may be connected in a star configuration or completely independent from each other. In the majority of cases, brushless motors have three-phase windings. In addition, the driving circuit may be integrated and have an output stage that drives the phase windings using a three-phase full-wave bridge circuit employing six MOS or bipolar power transistors.

Figure 1:
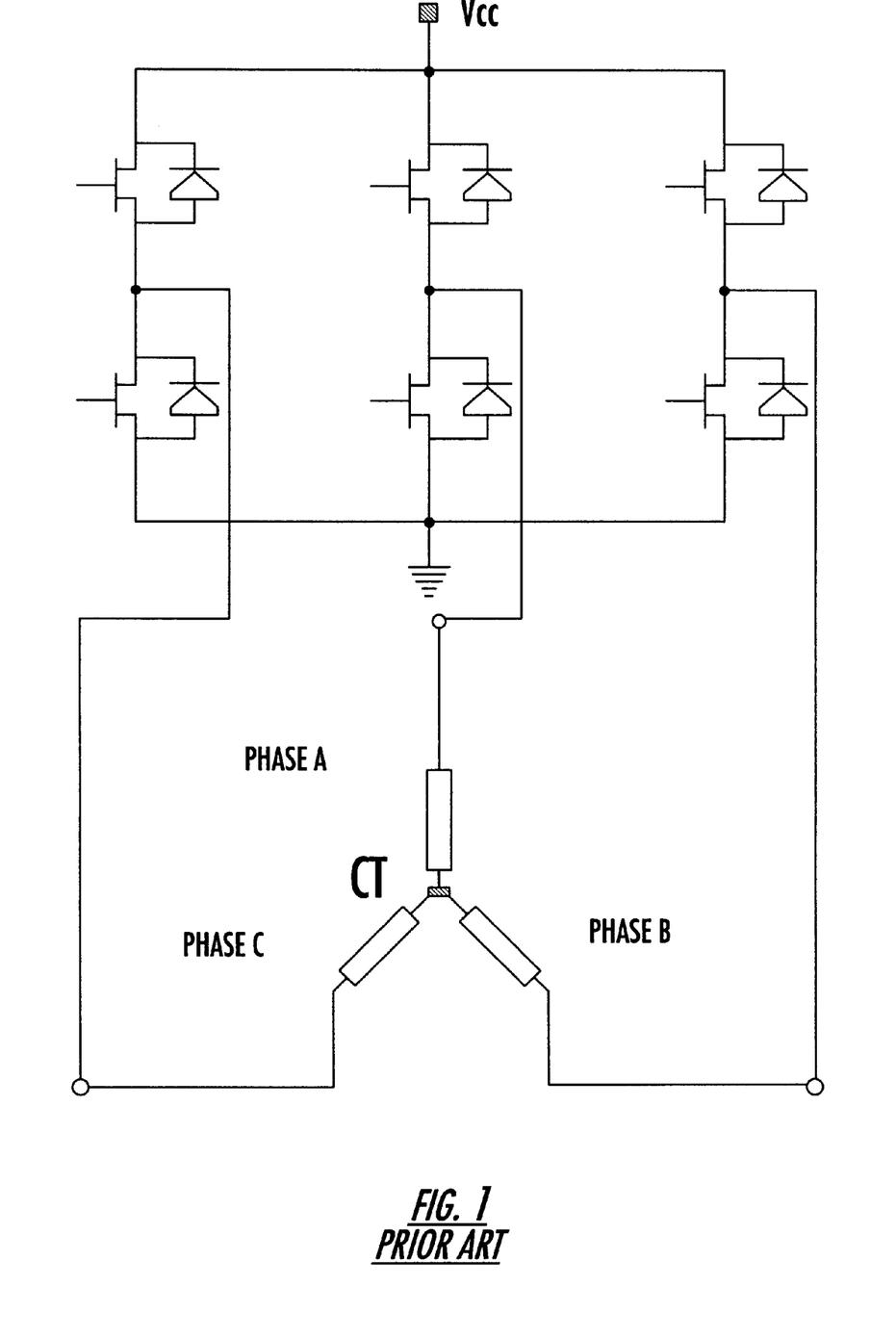
FIG. 1 shows a three-phase full-wave bridge used for driving a DC brushless motor as in the prior art.

FIG. 1 represents a driver stage and the electrical diagram of a DC brushless motor connected to the driver stage. A most typical mode of driving this type of motors is the so-called bipolar mode where at any instant two phase windings are powered and the third remains idle, that is, the output of the respective full-wave bridge is kept in a state of high impedance (Hi Z).

The phase windings are switchingly driven according to a cyclic sequence which must be synchronized with the rotor's instantaneous position. In a bipolar driving mode, the instantaneous position may be determined by monitoring the induced back-electromotive-force (BEMF) on the unpowered phase winding or detected by sensors (a more expensive approach that is seldom used).

Another driving mode for this type of motor is the so-called tripolar mode, or, more precisely and generally, the mode according to which all the motor's phase windings are constantly powered. This is a technique wherein detecting of the BEMF on a momentarily unpowered winding cannot be exploited and more sophisticated techniques must be resorted to.

To optimize the system's performance, the power supplied to the phase windings should be such as to operate the motor at its maximum efficiency. This is attained by driving the phase windings with a precise phase between the current forced through the phase winding and the relative BEMF induced thereon.

The torque in a permanent magnet synchronous motor, such as the brushless DC motor, is produced by the stator's current component that creates a magnetic field in quadrature with the rotor's magnetic field. By calling $i_d$ and $i_q$ the stator's current components that respectively generate a magnetic field in phase and in quadrature with the rotor's magnetic field, the maximum efficiency is obtained for $i_d=0$. To ensure that the whole stator's current generates a field in quadrature it is necessary to force the current through each phase winding in phase with the relative BEMF.

Driving the motor in a bipolar or even in a unipolar mode implies a certain ripple in the produced torque characteristic. The bipolar or unipolar driving does permit an easy detection of the BEMF on the winding or on the windings that are not excited to derive the required synchronous information to effect the phase switchings in perfect phase with the rotor position.

As a matter of fact, systems capable of implementing a tripolar driving mode have been developed to reduce or eliminate the torque ripple. In a tripolar driving mode all the phase windings are constantly driven by alternating (sinusoidal) signals, mutually out of phase from one another. Hence, to be able to "read" the BEMF signal, a momentary interruption of the driving of at least one phase winding of the motor, is effected by placing the respective driving bridge in a condition of high impedance (tristate). This is done for a time interval sufficient to detect a zero-cross event of the BEMF signal. From this information a synchronization signal of the motor's phase switchings is reconstructed. Nevertheless, these techniques introduce a certain torque ripple as compared to a pure tripolar driving mode, that is, without any interruptions for detecting the BEMF signal.

Many driving systems are designed to switch from a unipolar and/or bipolar mode to a tripolar mode and vice-versa. In practice, the motor is started and brought to a steady state by driving it in a unipolar and/or bipolar mode and, once the steady state speed is reached, the system switches to a tripolar driving mode to reduce or eliminate the torque ripple of the motor operating in a steady state condition. If Hall effect sensors are not employed, an alternative technique is based on the use of relatively complex electronic circuits capable of reconstructing a BEMF signal once the motor's electrical parameters (resistance and inductance) are known. The reconstructed BEMF signals are resorted to so as maintain a correct synchronization of the phase switchings during the operation in a tripolar mode.

It is evident that there is a need or usefulness of a method and a system capable of driving the motor at a steady state speed in a pure tripolar mode, thus minimizing or nullifying the torque ripple. This would also be desirable without driving interruptions necessary to monitor the BEMF or implementing complex reconstructing systems of the BEMF signal while ensuring a perfect synchronization of the phase switchings with the rotor's instantaneous position and optimizing the efficiency.

SUMMARY OF THE INVENTION

Therefore, a main object of the invention is to provide a system for detecting any perturbation of the phase angle between a driving voltage applied to a respective motor's phase winding and the relative BEMF during a tripolar mode driving of the motor, and without effecting any interruption of the driving or requiring a reconstruction of the BEMF signal.

This object is fully met by the method and related system of the invention which are based upon the monitoring of the modulation caused by the driving current forced through the motor's phase windings on the voltage present at their terminals.

The monitoring system of the invention is perfectly "transparent" and does not cause any undesired torque ripple, being at the same time capable of promptly detecting any perturbation of the switching synchronization with the instantaneous position of the rotor. By providing information on an occurred perturbation, the driving system can carry out a realigning or resynchronizing. This can be done, for example, by switching from a pure tripolar driving mode (steady state) to a bipolar mode or by momentarily passing from a pure tripolar driving mode to a tripolar driving mode, with interruption of the driving of at least one phase winding for a certain time interval during which the BEMF signal is sensed until recovering a correct synchronization and/or corrected steady state speed.

As soon as the optimal steady state running operating conditions are recovered, the driving system switches again to a pure (uninterrupted) tripolar mode. This minimizes the torque ripple during the steady state operating condition, and relies upon the monitoring system of the invention to detect any eventual new perturbation that may occur.

BRIEF DESCRIPTION OF THE DRAWINGS

The various aspects and advantages of the invention will become even clearer through the following description of the functioning principles of the method of the invention, as well as of an analysis of the behavior of the monitoring system of the invention for different situations, and by referring to the attached drawings, wherein.

$$Vdiff=Va-R^{\sim}*im;$$

DETAILED DESCRIPTION OF THE PREFERRED EMBODIMENTS

We now consider driving a generic brushless DC motor with three sinusoidal voltages out of phase by 120° and obtained, for instance, through a three-phase bridge stage as shown in FIG. 1. The portion relative to the phase A of such a system is highlighted in FIG. 2.

Figure 2:
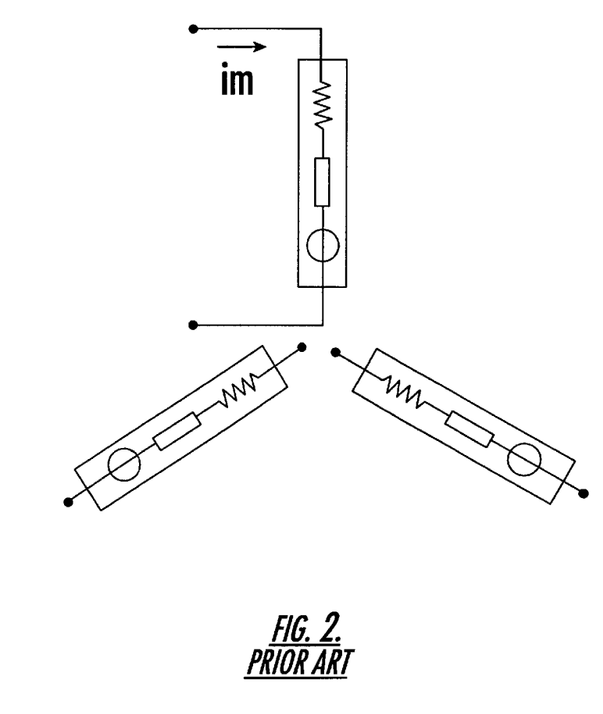
FIG. 2 is a partial equivalent electric scheme of a DC brushless motor as in the prior art, highlighting the phase A.

From this figure:

$$Vdiff=BEMF+Rm*im+Lm*d/dt\,im \quad (1.1)$$

wherefrom $$BEMF=Vdif-Rm*im-Lm*d/dt\,im \quad (1.2)$$

As it may be noticed, the BEMF signal can be obtained by solving equation 1.2, a solution that requires a dedicated electronic circuit comprising a differentiator, an amplifier and an adder. Moreover, it should be noted a current sensing resistor R~ is needed to monitor the current through the motor. In reference to FIG. 2 and the above equations, Va is the driving voltage of the winding, im is the driving current of the winding, Vdiff is the voltage difference between the drive voltage Va applied to the winding less the voltage drop across the resistive portion R~ of the drive current path external the winding, Rm is the resistance of the winding, Lm is the inductance of the winding, and BEMF is the back electromotive force of the winding.

The solution of equation 1.2 gives the instantaneous magnitude and phase of the BEMF and thus the information on the instantaneous rotor's position. Only the information on the phase is effectively used for synchronizing the driving voltage. This kind of approach is burdensome in terms of the resources required and needs to be adapted to the actual electrical parameters of the specific application.

Figure 3:
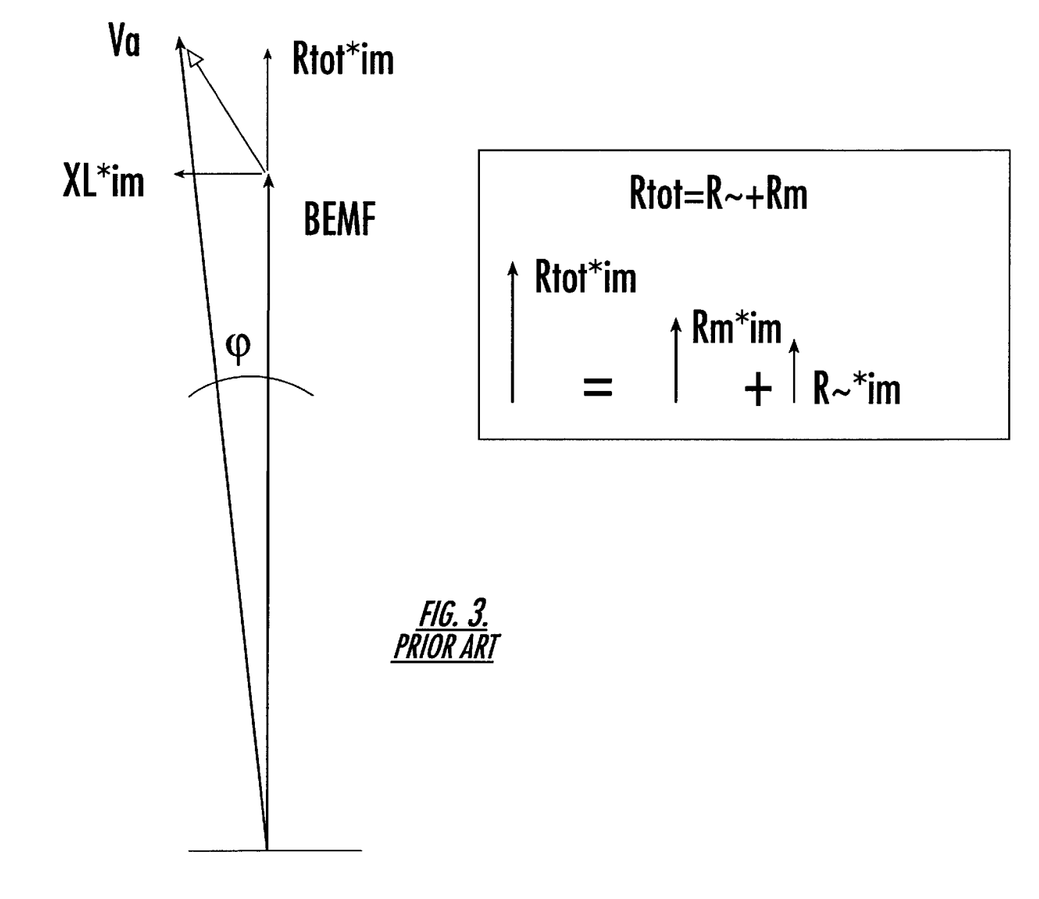
FIG. 3 indicates the conventional names used to identify pertinent electrical entities and parameters, as well as the electrical vector diagram for a condition of operation at maximum efficiency of a DC brushless motor as in the prior art (that is with the winding drive current in phase with the relative BEMF)

Let us now suppose information on the rotor's position (BEMF information) is available and that such information can be used to synchronize the driving voltage Va and to bring the motor to a steady state speed (using the information on the BEMF as a synchronization signal). To operate in a condition of maximum efficiency once at the desired steady state speed, it is necessary to impose a certain phase angle Φ between Va and the BEMF (that is to say between Va and the synchronization signal), as schematically illustrated in FIG. 3. In this condition, the current absorbed by the motor will be the least possible that ensures the required torque. This optional working condition may be easily achieved once the information on the BEMF phase is known. In reference to FIG. 3, R~ is the resistive portion of the drive current path external the winding, Rm is the resistance of the winding, and Rtot is the combined resistance of these two resistances. Current vectors are derived by multiplying the respective resistances by the driving current im. Another current vector is formed by multiplying the x component of the inductance Lm (XL) times the drive current im.

Figure 4:
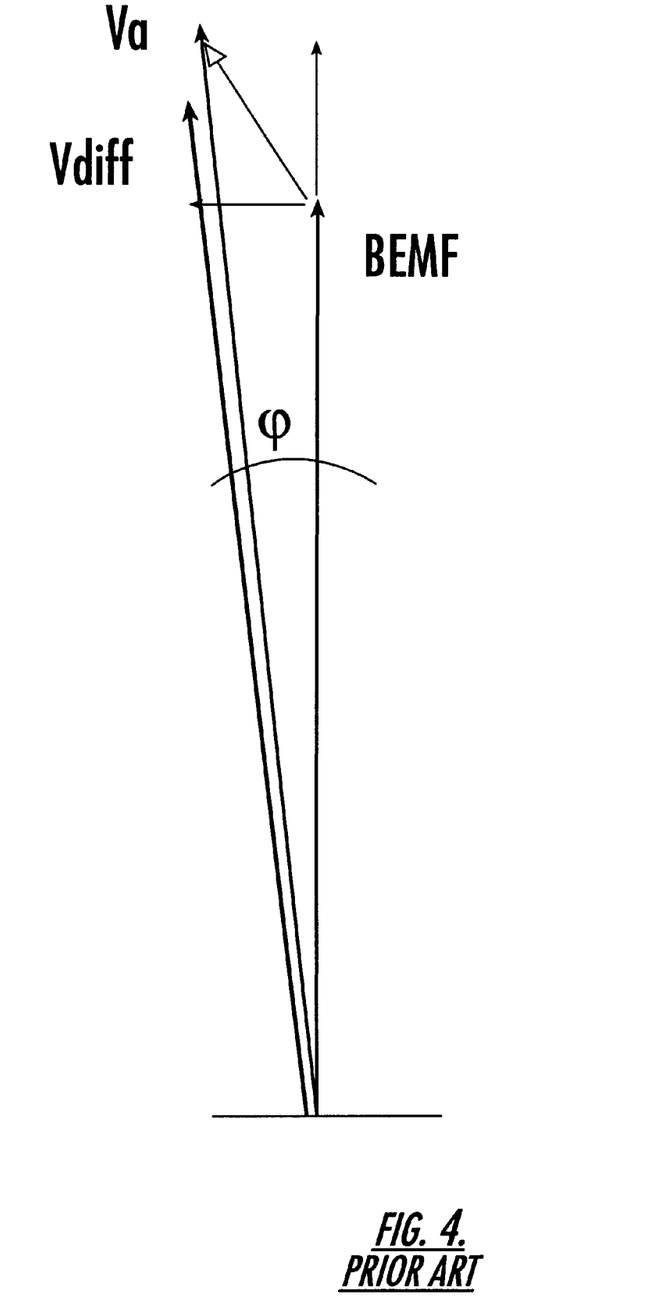
FIG. 4 graphically shows the Vdiff voltage of the prior art as given by the expression.

Let us now observe FIG. 4 which shows the Vdiff voltage given by the equation:

$$Vdiff=Va-R^{\sim}*im$$

where R~ is a generic resistance present between the node on which the driving voltage is applied and the motor's winding. As easily noticed, the voltage Vdiff is slightly out of phase with respect to the Va voltage and invariably leads the drive voltage Va.

If at t=0 the BEMF is substituted with Vdiff as the synchronization signal and if, at the same time, the lead phase angle Φ between Va and the synchronization signal is made null, the following takes place. At t=0 the system is in a situation very similar to the previous one. The only difference is that at the instant t=0⁻ the Vdiff phase is not exactly coincident with the Va phase. Therefore the system will find a new point of balance more similar to the preceding one the closer in value are the phases of Va and Vdiff at the instant t=0⁻. It can be demonstrated that for t>0 the system remains stable and it is possible to drive based upon monitoring Vdiff information on the eventual occurrence of external perturbations.

Figure 5:
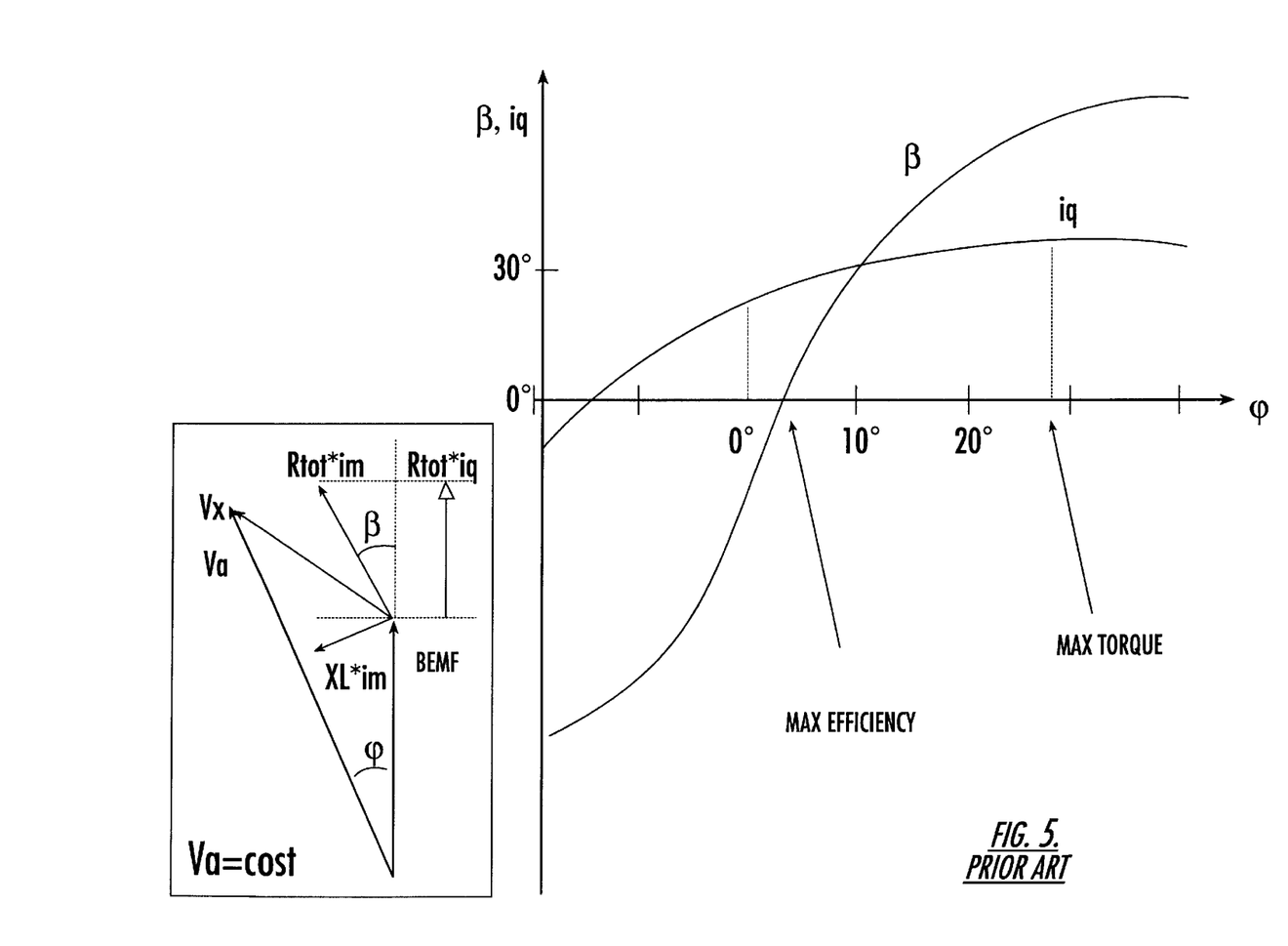
FIG. 5 shows the behavior of the phase β between the current and the BEMF for Va=cost and ω (the phase angle between Va and BEMF) varying between −27° and +27° with the identification of the maximum efficiency working point and the shape of the current $i_q$, the torque generating current component, with the identification of the point of maximum torque as in the prior art.

FIG. 5 shows the way the phase angle β between the current and the BEMF for a constant Va changes upon the varying of the phase angle Φ between Va and BEMF, as well as the diagram of the quadrature current $i_q$ (the current component that generates torque). As it may be noticed, the point of maximum efficiency does not coincide with the point of maximum torque. The latter is obtained with a phase lead of Va over BEMF greater than that required for maximum efficiency.

In the above example, a phase lead of Va of about 4° with respect to the BEMF is required for maximum efficiency. In contrast, a phase lead of about 28° is needed for a condition of maximum torque. It can be demonstrated that any perturbation causes the system to react to the disturbance with a negative feedback ensuring stability. An instantaneous increment of the resisting torque brings the rotor (and thus the BEMF) to a situation of augmented delay with respect to the drive voltage Va, and, therefore, to a condition of augmented torque generation (negative feedback). In contrast, a reduction of the phase angle between Va and BEMF causes the system to decrease the torque (negative feedback).

Figure 6:
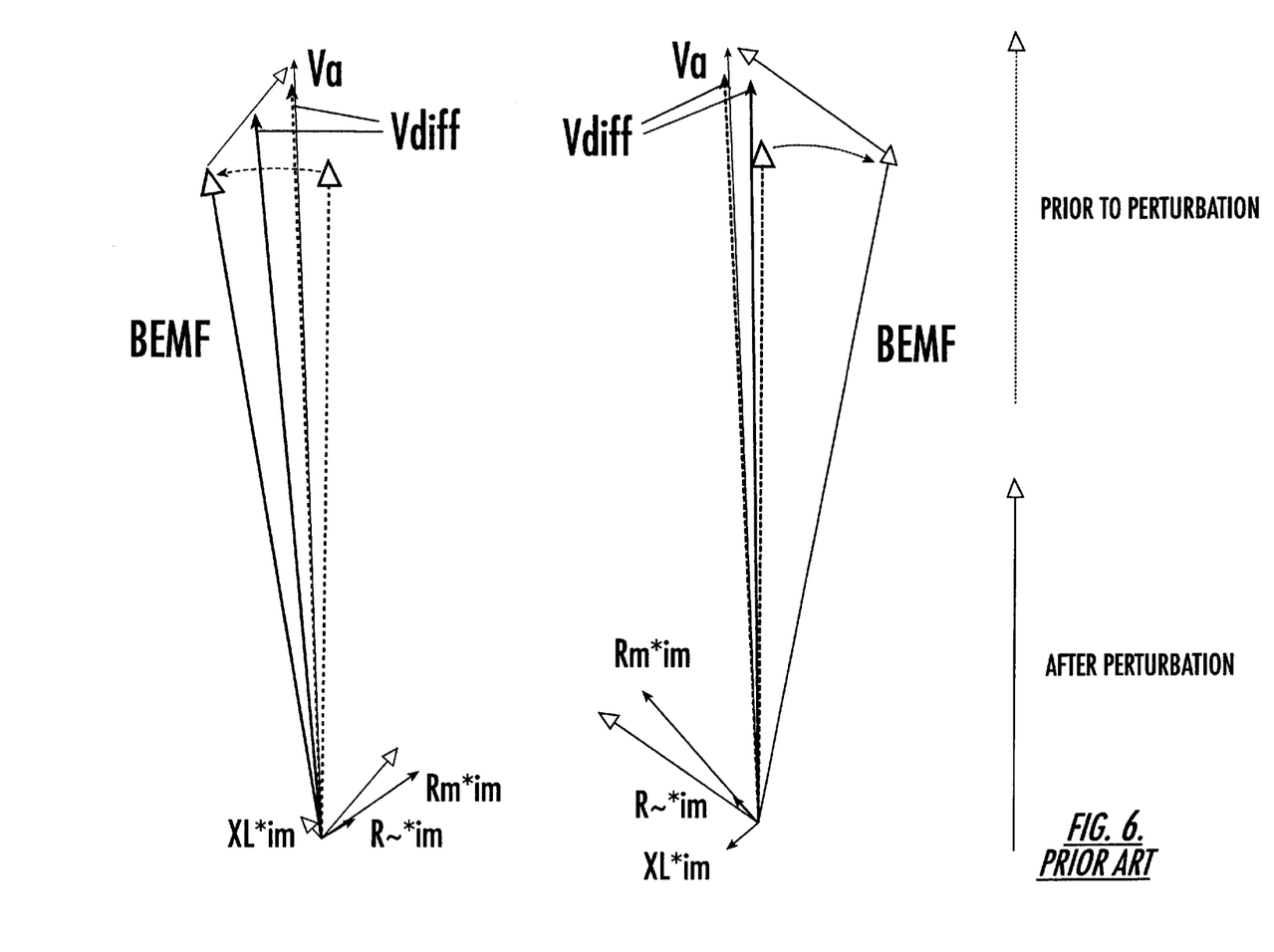
FIG. 6 shows the behavior of the Vdiff when ω varies between Va and BEMF as in the prior art.

The effect on Vdiff of a change of the phase angle between Va and BEMF caused by disturbances is highlighted in FIG. 6. This figure shows how upon a change of the phase angle between BEMF and Va (by any cause), the Vdiff undergoes a phase change of a different amount, but in the same direction of the phase change of the BEMF. The system is thus able to detect an instantaneous variation of the rotor's speed and decide the type of correction to be applied (e.g. adjust the frequency or vary the amplitude of the driving voltage or eventually decide to switch to a different driving mode that permits a direct monitoring of the BEMF).

The above description has been made based upon some simplifying conditions that are really not indispensable. For example, for t=0⁻ we have the operating condition of maximum efficiency that reduces the transient to the minimum when t=0 (change in the synchronizing signal). If a greater transient is accepted, the search for the point of maximum efficiency may be obviated (the phase angle ω between Va and BEMF) and the substitution of the synchronization signal may be carried out for less complicated conditions.

It can be demonstrated that for a wide out of phase range of deviations between Va and the synchronization signal, for either t=0⁻ or t=0⁺, the system is able to function correctly. The range of phase difference that can be handled by the system will depend on the load characteristics, however, it is very broad under all circumstances.

The way the motor reaches the steady state speed is irrelevant to the implementation and usefulness of the method of the invention which becomes effective when the motor is driven in a tripolar mode, a mode to which control systems of sensorless motors switch once the programmed steady state speed is reached. In practice, any known system for starting and driving the motor up to a programmed steady state speed may be used, for example, a bipolar or unipolar driving mode system or any other equivalent technique based on the monitoring of the BEMF. Besides allowing the reaching of a programmed steady state speed without problems, during such an initial or preceding driving phase, the basic hypothesis on which the method of the invention rests is acquired, that is, the necessary BEMF information at the instant t=0⁻ is acquired by the system of the invention.

Of course, the principle of the above described method is valid whichever is the element that determines the voltage drop between the node on which the driving voltage Va is applied and the motor's winding. This element is simply referred to as R⁻ in the above described analysis of the functioning of the system of the invention. If, for example, a MOS three-phase bridge is used to drive the motor, the voltage drop at the MOS terminals (RdsON) may be exploited for obtaining a Vdiff with the above emphasized characteristics. In this case, it is not necessary to use additional resistive elements because the intrinsic resistive characteristics of the power device may be validly exploited.

The principle of the invention remains valid for any type of driving stage as long as there exists a Vdiff voltage modulation with respect to the Va voltage caused by the current absorbed by the motor. Having said that, it becomes clear how the method remains valid for any type of driving (PWM, linear, etc.) and for any waveform eventually used to drive the motor in a tripolar mode.

Finally, it may be said that, according to the method of the invention, for a wide range of speed variations about the steady state value, if a modulation exists of the voltages at the motor's terminals in the above described sense, it is possible to use such a Vdiff signal in place of the BEMF signal to obtain effective information on the rotor's position.

Figure 7:
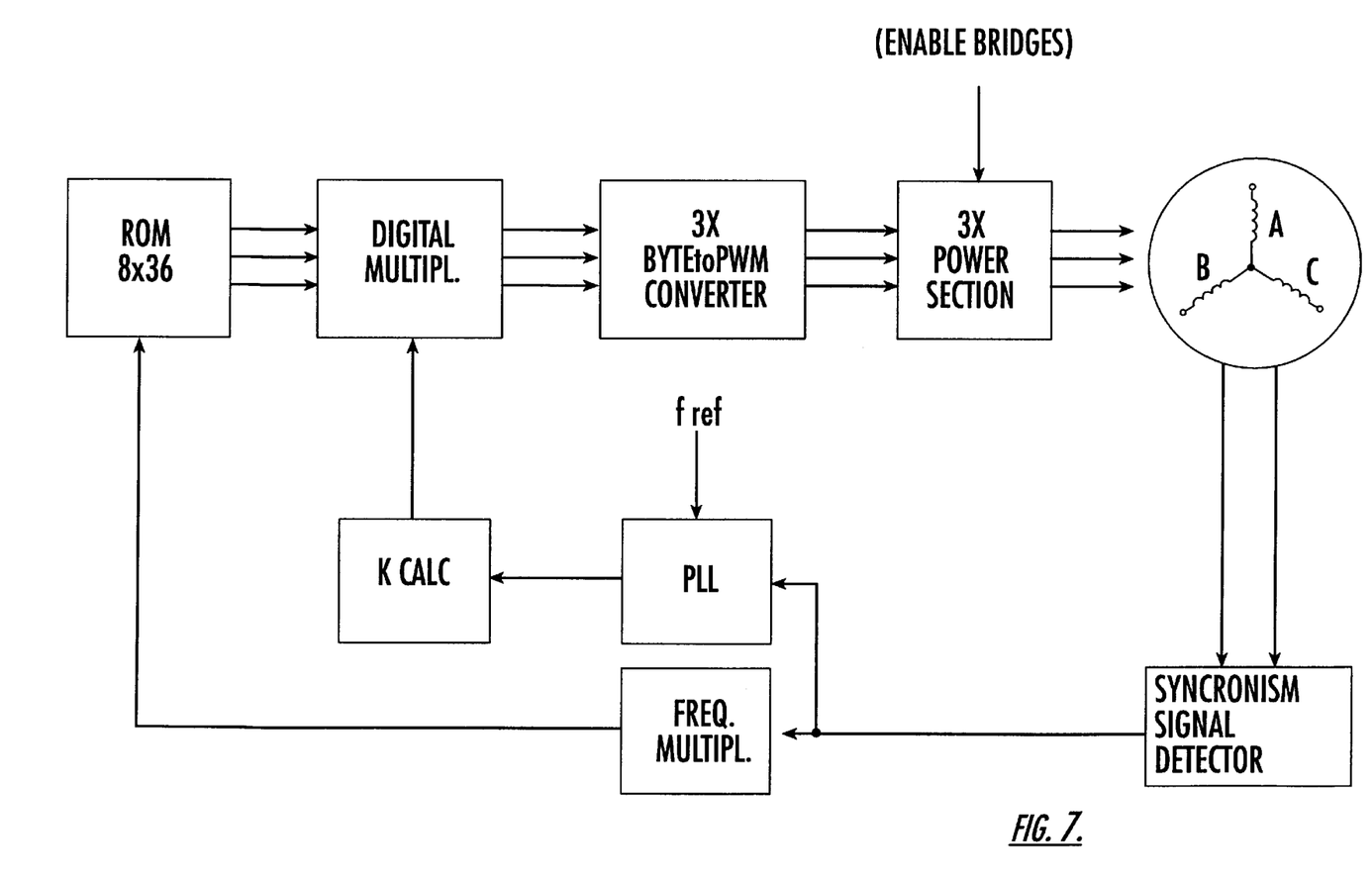
FIG. 7 is a high level block diagram of a driving system for a three-phase motor according to the present invention.

FIG. 7 is a block diagram of a possible application of the present invention. The block SYNCHRONISM SIGNAL DETECTOR together with the ENABLE BRIDGES signals operate the selection of the signal to be used as the synchronization signal (either Vdiff or the BEMF signal, as will be described further hereinbelow).

The block diagram of FIG. 7 depicts, by way of an example, a digital complementary type system for driving a brushless motor in a voltage mode, wherein the voltage profiles to be applied to the motor windings are stored in a 8*36 ROM memory. The scheme is a simplification of the system described in the patent application (EP-A 458,756), assigned to the assignee of the present invention and incorporated herein by reference. The main functions of the different blocks will be readily appreciated by those skilled in the art.

The ROM block contains the digital samples of the form to be applied to the motor. For example, if 36 samples that approximate the waveform are used and considering an 8 bit resolution, then the memory required is 8*36 bits.

The DIGITAL MULTIPL. block multiplies by a constant the digital data output by the ROM block. The value of the constant is calculated by the block K CALC as a function of the signal output by the PLL block, wherein an error signal between the real motor speed and the programmed speed is calculated.

The PWM CONVERTER block converts a digital number (byte) into a duty cycle (PWM). This block outputs, instant by instant, a PWM signal that reproduces the sample value which in that moment is pointed in the ROM memory, multiplied by K VAL.

The FREQUENCY MULTIPL. multiplies by 36 the electrical frequency of the running motor. This is necessary because this signal is used for scanning the ROM memory which stores the voltage profiles. Since there are 36 samples, the scanning of the ROM must be done with a frequency 36 times greater that the electrical frequency of the motor.

The ENABLE BRIDGES signals permit placing the output of one or more bridges (or half bridges) that drive the phase windings of the motor in a state of high impedance. This allows the monitoring of an intervening BEMF zero-cross event, information that will be available at the output of the SYNCHRONISM SIGNAL DETECTOR block shown in more details in FIG. 8.

Figure 8:
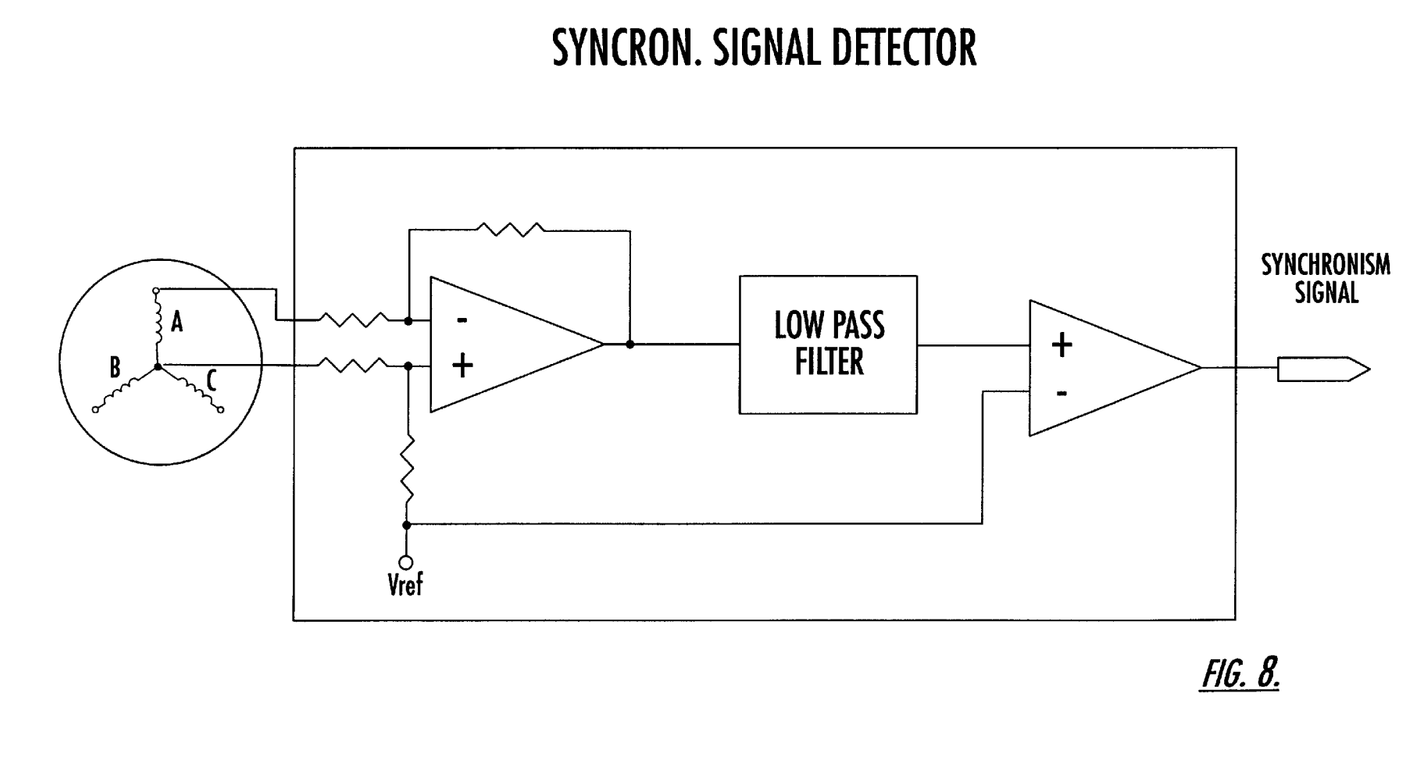
FIG. 8 is a scheme of the block monitoring the synchronization signal according to the present invention.

FIG. 8 represents the SYNCHRONISM SIGNAL DETECTOR block whose input is the voltage called Vdiff existing on the terminals of a phase winding of the motor and that outputs the signal that is used as a synchronization signal. Being that the signal applied to the inputs of the operational amplifier (OP-AMP) is a differential signal that may not be referred to ground or to any other common potential, the non-inverting input node (+) of the operational amplifier, as well as the one of the output comparator (Comp), are referred to a certain reference voltage (Vref) of a pre-established value.

In case the ENABLE BRIDGES signals are used to interrupt the drive current in the phase winding connected to the SYNCHRONISM BLOCK DETECTOR block, the synchronization signal will coincide with the BEMF of that phase winding.

On the contrary, in case none of the bridge/s or half-bridge/s outputs are placed in a high impedance state, as for example under steady state conditions, the signal detected at the terminals of the motor's winding (that is the synchronization signal) will be the voltage difference between the drive voltage applied to the motor (referred to as Va) and the voltage drop ($R^{-*}$Imotor) on a resistive portion of the current path between the output of the driving bridge and the motor's winding, according to the method of the invention.

That which is claimed is:

1. A method of detecting a relative position of a rotor of a sensorless DC brushless motor driven in a tripolar mode comprising the step of:
   monitoring a voltage difference between a drive voltage applied to at least one winding of the motor and a voltage drop on a resistive portion of a drive current path through the at least one winding, the voltage drop resulting from current being driven through the drive current path when the motor is driven in the tripolar mode.

2. A method according to claim 1, wherein the voltage drop is detected between two current terminals of a MOS power device of a driving bridge of the at least one winding.

3. A method according to claim 1, further comprising the step of using the monitoring of the voltage difference to signal a perturbation from a pre-existing condition of correct synchronization of the phase switchings during a driving phase in the tripolar mode.

4. A method according to claim 3, further comprising the step of causing the driving system to switch to one of a bipolar mode, a unipolar mode, or a tripolar mode with momentary drive interruptions responsive to the perturbation.

5. A method according to claim 4, further comprising the step of switching back to the tripolar mode after restoring a correct synchronization condition and/or attaining a correct rotating speed.

6. A method according to claim 1, wherein the voltage difference is used as a synchronization signal in substitution for a BEMF signal by the driving system of the motor.

7. A method of operating a sensorless DC brushless motor comprising the steps of:
   driving the motor in a tripolar mode; and
   detecting a relative position of a rotor of the motor by monitoring a voltage difference between a drive voltage applied to at least one winding of the motor and a voltage drop on a resistive portion of a drive current path through the at least one winding, the voltage drop resulting from current being driven through the drive current path.

8. A method according to claim 7, wherein the voltage drop is detected between two current terminals of a MOS power device of a driving bridge of the at least one winding.

9. A method according to claim 7, further comprising the step of using the monitoring of the voltage difference to signal a perturbation from a pre-existing condition of correct synchronization of the phase switchings during a driving phase in the tripolar mode.

10. A method according to claim 7, further comprising the step of causing the driving system to switch to one of a bipolar mode, a unipolar mode, or a tripolar mode with momentary drive interruptions responsive to the perturbation.

11. A method according to claim 10, further comprising the step of switching back to the tripolar mode after restoring a correct synchronization condition and/or attaining a correct rotating speed.

12. A method according to claim 7, wherein the voltage difference is used as a synchronization signal in substitution for a BEMF signal by the driving system of the motor.

13. A method of operating a sensorless DC brushless motor comprising the steps of:
   driving the motor in a tripolar mode;
   detecting a perturbation from a pre-existing condition of correct synchronization of phase switchings by monitoring a voltage difference between a drive voltage applied to at least one winding of the motor and a voltage drop on a resistive portion of a drive current path through the at least one winding, the voltage drop resulting from current being driven through the drive current path; and
   causing the driving system to switch to one of a bipolar mode, a unipolar mode, or remain in the tripolar mode with momentary drive interruptions responsive to a detected perturbation.

14. A method according to claim 13, wherein the voltage drop is detected between two current terminals of a MOS power device of a driving bridge of the at least one winding.

15. A method according to claim 13, further comprising the step of switching back to the tripolar mode after restoring a correct synchronization condition and/or attaining a correct rotating speed.

16. A method according to claim 13, wherein the voltage difference is used as a synchronization signal in substitution for a BEMF signal by the driving system of the motor.

17. A drive system for a sensorless DC brushless motor comprising:
   a drive circuit for driving the motor in a tripolar mode; and
   a detecting circuit for detecting a relative position of a rotor of the motor by monitoring a voltage difference between a drive voltage applied to at least one winding of the motor and a voltage drop on a resistive portion of a drive current path through the at least one winding, the voltage drop resulting from current being driven through the drive current path.

18. A system according to claim 17, wherein said drive circuit comprises at least one MOS power device; and wherein said detecting circuit detects the voltage drop between two current terminals of the at least one MOS power device.

19. A system according to claim 17, wherein said detecting circuit uses the monitoring of the voltage difference to signal a perturbation from a pre-existing condition of correct synchronization of the phase switchings during a driving phase in the tripolar mode.

20. A system according to claim 19, wherein said detecting circuit causes the driving circuit to switch to one of a bipolar mode, a unipolar mode, or a tripolar mode with momentary drive interruptions responsive to the perturbation.

21. A system according to claim 20, wherein said detecting circuit further switches back to the tripolar mode after restoring a correct synchronization condition and/or attaining a correct rotating speed.

* * * * *